(12) United States Patent
Lai

(10) Patent No.: US 10,233,346 B2
(45) Date of Patent: Mar. 19, 2019

(54) CONDUCTIVE INK COMPOSITION AND CONDUCTIVE ARCHITECTURE FOR WIRELESS ANTENNA

(71) Applicant: Chung-Ping Lai, Hsinchu County (TW)

(72) Inventor: Chung-Ping Lai, Hsinchu County (TW)

( * ) Notice: Subject to any disclaimer, the term of this patent is extended or adjusted under 35 U.S.C. 154(b) by 0 days.

(21) Appl. No.: 15/825,271

(22) Filed: Nov. 29, 2017

(65) Prior Publication Data
US 2018/0079924 A1 Mar. 22, 2018

Related U.S. Application Data

(63) Continuation-in-part of application No. 14/599,562, filed on Jan. 19, 2015, now abandoned.

(51) Int. Cl.
| | |
|---|---|
| *H01Q 1/36* | (2006.01) |
| *H01Q 1/38* | (2006.01) |
| *C09D 11/52* | (2014.01) |
| *C09D 11/037* | (2014.01) |

(52) U.S. Cl.
CPC ............ *C09D 11/52* (2013.01); *C09D 11/037* (2013.01); *H01Q 1/368* (2013.01); *H01Q 1/38* (2013.01)

(58) Field of Classification Search
CPC ............. B41M 5/52; B32B 5/16; B82Y 30/00
USPC .................. 428/32.34, 432; 427/77
See application file for complete search history.

(56) References Cited

U.S. PATENT DOCUMENTS

| | | | |
|---|---|---|---|
| 7,763,187 B1 | 7/2010 | Veedu et al. | |
| 8,709,187 B2 | 4/2014 | Smith et al. | |
| 2002/0045050 A1* | 4/2002 | Tamai ................. | B32B 5/16 |
| | | | 428/432 |
| 2005/0191445 A1* | 9/2005 | Sen ..................... | B41M 5/52 |
| | | | 428/32.34 |
| 2010/0000441 A1 | 1/2010 | Jang et al. | |
| 2011/0171364 A1* | 7/2011 | Xing .................. | B82Y 30/00 |
| | | | 427/77 |

FOREIGN PATENT DOCUMENTS

| | | |
|---|---|---|
| CN | 101650982 A | 2/2010 |
| CN | 103436099 A | 3/2016 |

* cited by examiner

*Primary Examiner* — Khanh T Nguyen

(57) ABSTRACT

A binder-free conductive ink with a conductive cage architecture for the wireless antenna with adhesion enhancement by carbon powders that aims to enormously reduce the solid content of conductor and can be used to print antennas. For example, silver content of the ink composition is greatly decreased due to the absence of insulated binder. Carbon powders (such as graphene nanoplatelets) are added as a conductive "cage" to reduce the use of insulated binder and significantly improve the conductivity of ink under low addition of conductor. Compression after printing is an innovative finding that not only improves the adhesion of a binder-free conductive ink with a conductive cage architecture but also enhances its conductivity. Such effects are credited to excellent contact between interfaces of particles and substrate. The unique recipe and process save printing from high-temperature sintering, further reducing processing cost and widening applicable substrates.

5 Claims, 2 Drawing Sheets

| Compression gap of roller | Average resistance (Ohm) | |
|---|---|---|
| | Binder-contained conductive ink | Binder-free conductive ink |
| Pristine | 6.8 | 6.1 |
| 20 μm | 56.7 | 4.2 |
| 10 μm | 3.4 | 1.3 |
| 0 μm | 13.5 | 0.9 |

FIG. 4

CONDUCTIVE INK COMPOSITION AND
CONDUCTIVE ARCHITECTURE FOR
WIRELESS ANTENNA

This application is a Continuation-in-Part of application Ser. No. 14/599,562, filed Jan. 19, 2015.

BACKGROUND OF THE INVENTION

Field of the Invention

The present invention relates to a binder-free conductive ink composition, conductive cage architecture, and fabrication process for wireless antenna which decreases its metallic filler content of conductive ink but still maintains high conductivity.

Description of the Prior Art

Conductive inks for printing process like screen printing and inkjet printing are so expensive that the utilization of printing process cannot prevail over metal-etching process that result in high cost and poisonous pollution.

Metals like silver, nickel and copper as the conductive materials are the key reason why the price of conductive ink remains very high. How to cut down on the metal amount and still maintain the resistance is the key issue.

On the other hand, high sintering temperature of metals often confines the choices of substrates and application.

In the coming age of internet of things, wireless devices with antennas play an important role. Traditional antenna in devices is made of copper or aluminum by etching process. The process is not only expensive but also produces many high-pollution wastes. In addition, etching process also confines the choices of substrates. Therefore, printing processes such as screen printing and inkjet printing catch the spotlight recently.

Although printing processes are cost-saving and eco-friendly. The conductive inks in printing process are very expensive, and may suffer from poor stability or limited life time. Conductive materials in the conductive inks are made of metals like silver, nickel, and copper. Compared to carbon species, metallic conductors are both high-priced and have potential oxidation problems.

U.S. Pat. No. 7,763,187 disclosed that CNT (buckyballs, and graphene were also alternatively used) was proposed to bridge the gap between separated silver. The CNT-reinforced silver ink showed greater mechanical, electrical, and thermal properties. In this patent, silver content is 2 to 95 wt %.

U.S. Pat. No. 8,709,187 disclosed that aqueous silver ink for use in RFID was proposed. Sheet resistance can be as low as 120 mohm/sq (~24 mohm/sq/mil), by which the read range was at least 3 meter. Carbon, typically carbon black and graphite, may also be used as conductive materials. Silver content is about 50 to 70 wt % of the composition, and resins is about 4 to 10 wt %.

CN Publication No. 103436099 taught that a low-cost silver/carbon ink was proposed for screen printing. Ink consists of 55 to 72 wt % of C/Ag composites and 10 to 25 wt % of conductive resins. Coating can be dried under 130° C. to 150° C. Cost was said to save 30%.

CN Publication No. 101650982A disclosed a silver-based conductive ink. Ink mainly consists of 1-25 wt % polymer resins, 20-55 wt % silver powders, 0-8 wt % graphite, 20-60 wt % solvent, and other additives. Graphite power can be used as auxiliary conductive filler to reduce the cost of ink.

Furthermore, CN Publication No. US2010000441A1 taught that the graphene preparation and the graphene-based conductive inks comprising other fillers for electrically and thermally conductive application.

The present invention has arisen to mitigate and/or obviate the afore-described disadvantages.

SUMMARY OF THE INVENTION

All of above prior arts show polymer resin binders were essential in their composition. The primary objective of the present invention is to provide a binder-free conductive ink composition, conductive cage architecture, and fabrication process for wireless antenna, which decreases its content of metallic filler but still maintains high conductivity.

To obtain above objective, a binder-free conductive ink composition, conductive carbon cage architecture, and fabrication process for wireless antenna provided by the present invention contains: metal powders, carbon powders, at least one dispersant, and a solvent. In fabrication process, post-compression treatment was carried to obtain good adhesion, high conductivity, and good performance antenna after the antenna printing.

In the composition of binder-free conductive ink, the metal powders account for 10 to 60 wt % of the conductive ink composition. The metal powders, such as gold, silver, copper, cobalt, nickel, zinc, their alloys, as well as core-shell/or silver-coated particles, have a grain size ranging from 10 nm to 100 µm in flake, particle, or rod/wire shapes.

The carbon powders used as conductive cage are 5 to 20 wt % of the total solid content of the conductive ink composition. The carbon powders consist of at least one of graphene, graphite, carbon black, or carbon nano tubes, have a thickness ranges from 1 to 10000 nm, and a grain size is from 0.1 to 100 µm.

The at least one dispersant is added at 0.01 to 0.1 wt % of a total solid content of a conductive ink composition.

The solvent has at least one carrier and accounts for 30 to 75 wt % of the conductive ink composition.

BRIEF DESCRIPTION OF THE DRAWINGS

FIG. 4 is a table showing resistance comparison of conductive line printed by binder-contained and binder-free silver/carbon ink before and after compression.

DETAILED DESCRIPTION OF THE PREFERRED EMBODIMENTS

A binder-free conductive ink composition and conductive cage architecture for wireless antenna according to the present invention decreases its metal content but still maintains high conductivity.

There are mainly two methods in the preceding ink history: 1. Adjusting conductive materials like adding supplementary metals, carbons, or surface-treated silver; and 2. Replacing insulate binder with conductive polymers.

Carbon can be used as a conductive filler, for example, carbon materials such as graphene, CNT, graphite, etc., have been widely proposed to be either added as supplementary conductive materials or as conductive bridging between silver particles.

On top of the foregoing proposal, we propose carbon materials not only can function as conductive filler but also as a cage architecture to catch the other conductive particles in the binder-free conductive ink.

Figure 1:
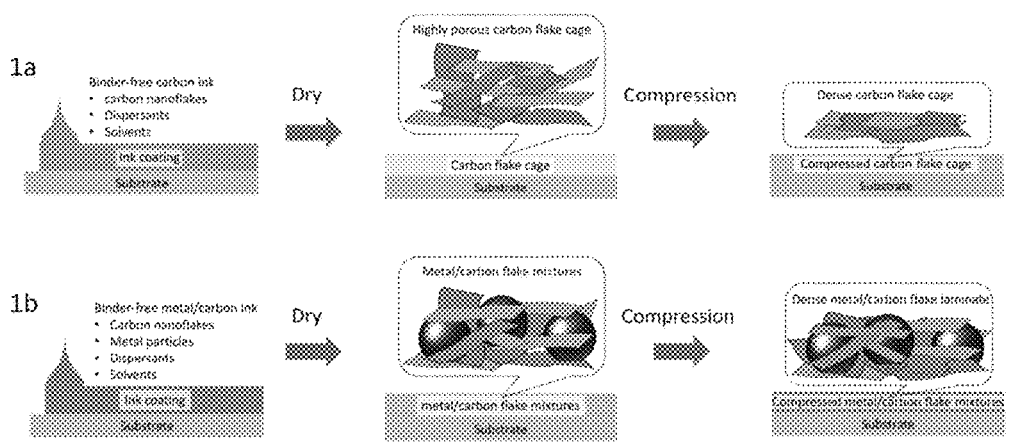
FIG. 1a is a schematic illustration of binder-free conductive carbon "cage" according to the present invention.
FIG. 1b is a schematic illustration of conductive carbon "cage" to catch metal particles in carbon laminate according to the present invention.

As a schematic illustration shown in FIG. 1a, carbon materials will build a highly porous mixture that was proposed as conductive carbon cage architecture in the present invention. On the other hand, compression was further applied to close the porous space to form a dense conductive laminate. In FIG. 1b, metal powders was trapped and linked by the conductive carbon cage architecture unlike the case of insulator-typed binders. The door of this cage mixture was closed to grip metal particles without any polymer binder connection after compression. The absence of insulator-typed binders makes ink more conductive. Therefore, this idea leads to binder-free metal/carbon ink, which greatly enhances the conductivity due to the absence of insulate binder. Carbon material in this invention is not only conductive filler but also an efficient cage architecture to catch metal particles.

The adhesive ability of graphitic carbon materials results from van der Waal forces between interfaces. Since van der Waal force is counter-proportional to distance, adhesion can be improved by purely compression of the coating without any help of binders.

Figure 2:
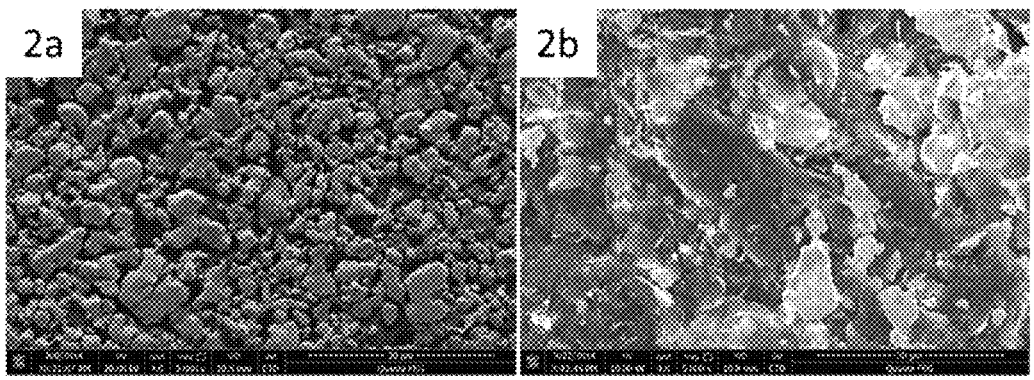
FIG. 2a is a SEM image of commercial silver ink coating.
FIG. 2b is a SEM image of the binder-free silver/carbon ink showing that graphitic carbon flakes trapped silver particles and filled the voids in between according to the present invention.

From SEM images of commercial binder-contained silver ink, as shown in FIG. 2a, plenty of voids can be found. Therefore, sintering between particles and binders are indispensable to ensure metal connection and ink adhesion. On the other hand, as illustrated in FIG. 2b, SEM image of the binder-free silver/carbon ink in this invention showed that the voids between silver was completely filled by carbon materials. With its adhesive ability, carbon materials works as an effective conductive cage to trap silver particles in the binder-free conductive ink.

As mentioned previously, compression, decreasing the distance between carbon materials and other interfaces, can greatly enhance the adhesion. Such concept is more practical as the silver content within ink composition is at low level. Nevertheless, compression also helps the connection within silver-silver interface, regardless of the presence of carbon in between, because silver is a ductile metal. It is therefore saving inks from high-temperature sintering process.

Figure 3:
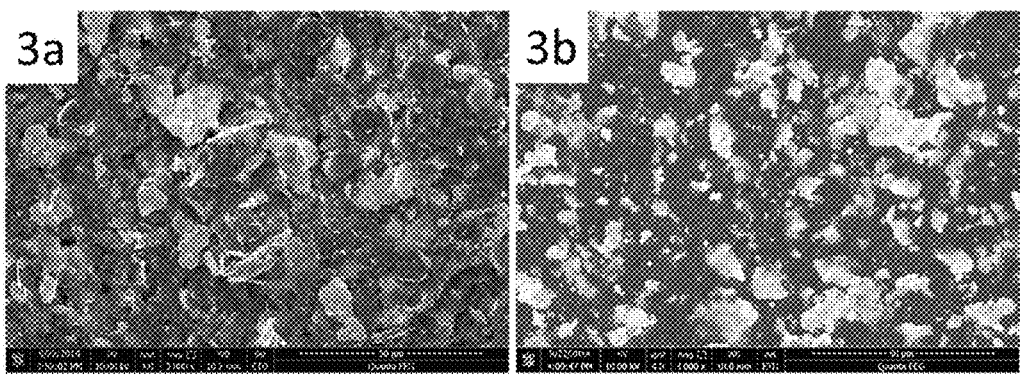
FIG. 3a is a SEM image of binder-free silver/carbon ink coating before compression according to the present invention.
FIG. 3b is a SEM image of the binder-free silver/carbon ink coating after compression according to the present invention

The concept of conductive carbon cage architecture was further identified by the SEM observation. From SEM images of as-deposited and compressed coating, as shown in FIGS. 3a and 3b, improved contacts can be observed. As-deposed silver/carbon coating exhibited a porous and irregular architecture, which became dense film after rolling compression. Thus, porous carbon mixture was considered as a conductive cage architecture to catch Ag particles without any polymer binder connection after rolling compression. So compressed coating with firm contacts between particles and surfaces illustrate both high conductivity and good adhesion.

Here two examples are tested by the binder-contained and binder-free conductive inks.

EXAMPLE 1

Binder-contained Conductive Ink

Here the composition of binder-contained conductive ink is a common composition, which consists of 10% acrylic binder, 50% Ag powders, 8% graphene powders, 2% other additives, and 30% solvent. A line pattern with 40 mm in length and 2 mm in width was used to print the conductive line. The ink performance was evaluated by the two-side resistance of printed conductive line. The resistance before and after compression is shown as FIG. 4.

EXAMPLE 2

Binder-free Conductive Ink

Here we removed the 10% acrylic binder from the binder-contained conductive ink shown in Example 1 to form a binder-free conductive ink. So the composition of binder-free conductive ink consists of 56% Ag powders, 9% graphene powders, 2% other additives, and 33% solvent. A line pattern with 40 mm in length and 2 mm in width was used to print the conductive line for test. The resistance before and after compression is shown as FIG. 4.

From FIG. 4, one can find that resistance of conductive line printed by binder-contained and binder-free conductive ink is similar before rolling compression. However, the adhesion of conductive line printed by binder-free ink is not good enough for the further application. So a further compression is applied to improve the adhesion and resistance of conductive line printed by binder-free ink. However, the resistance of conductive line printed by binder-contained ink increased 8.3 times after rolling at a 20 μm gap of compression rollers even if graphene is within the mixture. On the other hand, the resistance of conductive line printed by binder-free ink shows an opposite trend, which decreased by ca. 69% at the same compression condition. When we further short the gap of compression rollers, the resistances of conductive lines printed by binder-free ink will further reduce with the decrease of compression gap. When the compression gap was reduced to 0 μm, the resistance of conductive line printed binder-free ink is as low as 0.9 Ohm. However, at the same condition, the resistance of conductive line printed by binder-contained ink increase to 13.5 ohm, which is 15 times higher than that of binder-free ink. At the beginning, the increase of resistance of binder-contained conductive ink is due to the connection between electrically conductive fillers within the matrix of binder being broken after compression, while the resistance of conductive ink without any binder is decreased due to better contacts between graphene and other conductive particles. At 0 μm compression rolling gap, a few binder starts to stick on the surface of roller, so the resistance of binder-contained ink will raise again.

After rolling compression, due to smaller distance between particles, Van der Waals force also increases, so the adhesion is better, but such effect is not significant in the binder-contained conductive ink, because fillers are encapsulated by binder. Accordingly, enhancement of conductivity and adhesion by compression is not inherent to any conductive ink even if graphene as fillers is within the adhesive matrix. The critical limitation would be that the insulate binders inside the adhesive matrix interferes the connection between graphene, and cannot be significantly improved by compression. The phenomenon of resistance increase also can be observed after compression from a common epoxy-based conductive Ag ink. Because of the sticking issue of binder on roller surface and the unobvious improvement on resistance, post-treatment of compression is not observed for binder-contained conductive ink in the industrial fabrication process. Beside the compositions between binder-free and binder-contained inks are different, the ink properties and the requirement of post-treatment process to reach the low conductivity are also different for such two kinds of inks.

The property of conductive ink not only depends on the intrinsic characteristic of ink, but also the recipe and the applying process. In this invention binder-free conductive ink is proposed, and further compression will be applied to enhance adhesion and electrical conductivity, which is totally different to the systems of binder-contained inks. Therefore, the present invention related to a conductive ink composition and conductive cage architecture for wireless antenna is unique and different to the prior arts.

In the composition of binder-free conductive ink, the metal powders account for 10 to 60 wt % of the conductive ink composition. The metal powders, such as gold, silver, copper, cobalt, nickel, zinc, their alloys, as well as core-shell/or silver-coated particles, have a grain size ranging from 10 nm to 100 µm in flake, particle, or rod/wire shapes.

The carbon powders used as conductive cage are 5 to 20 wt % of the total solid content of the conductive ink composition. The carbon powders consist of at least one of graphene, graphite, carbon black, or carbon nano tubes, have a thickness ranges from 1 to 10000 nm, and a grain size is from 0.1 to 100 µm.

The at least one dispersant is added at 0.01 to 0.1 wt % of a total solid content of a conductive ink composition. It can be either non-ionic dispersant such as P-123, Tween 20, Xanthan gum, Carboxymethyl Cellulose (CMC), LA132, Triton X-100, Polyvinyl Alcohol (PVA), Polyvinylpyrrolidone (PVP), Brji 30, or ionic dispersant like Poly(sodium 4-styrenesulfonate) (PSS), 3-[(3-Cholamidopropyl)dimethylammonio]-1-propanesufonate (CHAPS), Hexadecyltrimethylammonium bromide (HTAB), Sodium dodecyl sulfate (SDS), 1-Pyrenebutyric acid (PBA). At least one of the dispersants is added at 0.01 to 0.1 wt % of the total solid content.

The solvent has at least one carrier and accounts for 30 to 75 wt % of the conductive ink composition. Solvent of the conductive ink composition can possess one or more carriers. Carriers can be aqueous, organic, or inorganic. Examples of suitable carriers include Methyl-2-pyrrolidone (NMP), IPA (Isopropyl alcohol), ethanol, glycerol, ethylene glycol, butanol, propanol, propylene glycol monomethyl ether (PGME), propylene glycol monomethyl ether acetate (PGMEA), Benzene, Toluene. Solvent accounts for 30 to 75 wt % of the conductive ink composition.

Thermal drying is the main drying method of the conductive ink. Heating temperature can be within 30 to 300° C. The higher the temperature is, the faster the drying is realized. After drying, antenna is further compressed to let conductive carbon cage to trap metal particle and raise adhesion and density of the printed conductive line. Compression ratio is 0.5 to 99% of the original thickness.

Thereafter, binder-free conductive ink was printed onto papers in different RFID antenna patterns by screen printing. After ink drying, compression was applied to reduce the resistance of antenna and enhance its adhesion. The read ranges of tags can reach 4~10 meters for various antenna shapes, which indicated wide application of screen-printed antenna.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A binder-free conductive ink with a conductive cage architecture for wireless antenna consisting of:
   (a) 10 to 60 wt % metal powders in a total solid content of a conductive ink composition;
   (b) 5 to 20 wt % carbon powders in a total solid content of a conductive ink composition;
   (c) at least one dispersant added at 0.01 to 0.1 wt % of a total solid content of a conductive ink composition;
   (d) at least one solvent accounted for 30 to 75 wt % of the conductive ink composition.

2. The binder-free conductive ink with a conductive cage architecture for wireless antenna as claimed in claim 1, wherein the metal powders are selected from gold, silver, copper, cobalt, nickel, zinc, their alloys, as well as core-shell/ or silver-coated particles, with a grain size ranging from 10 nm to 100 µm in flake, particle, or rod/wire shapes.

3. The binder-free conductive ink with a conductive cage architecture for wireless antenna as claimed in claim 1, wherein the carbon powders used as conductive cage consist of at least one of graphene, graphite, carbon black, or carbon nanotubes, wherein thickness of the carbon powders ranges from 1 to 10000 nm, and a grain size of the carbon powders is from 0.1 to 100 µm.

4. The binder-free conductive ink with a conductive cage architecture for wireless antenna as claimed in claim 1, wherein the at least one dispersant is selected from ionic or non-ionic dispersants.

5. The binder-free conductive ink with a conductive cage architecture for wireless antenna as claimed in claim 1, wherein the at least one solvent is selected from aqueous, organic, inorganic carriers, and their mixtures.

* * * * *